United States Patent Office 3,177,777
Patented Apr. 13, 1965

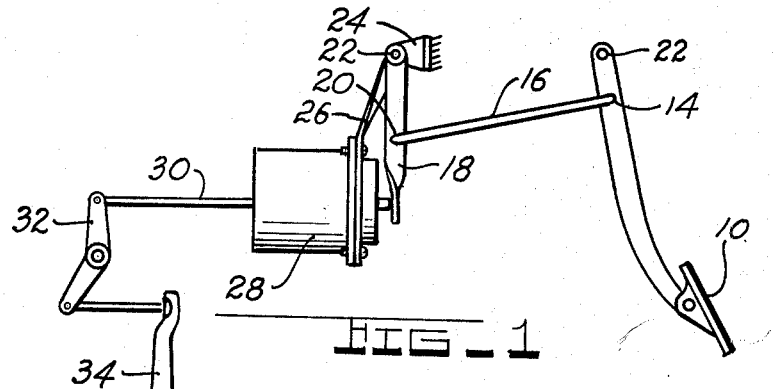
FIG_1
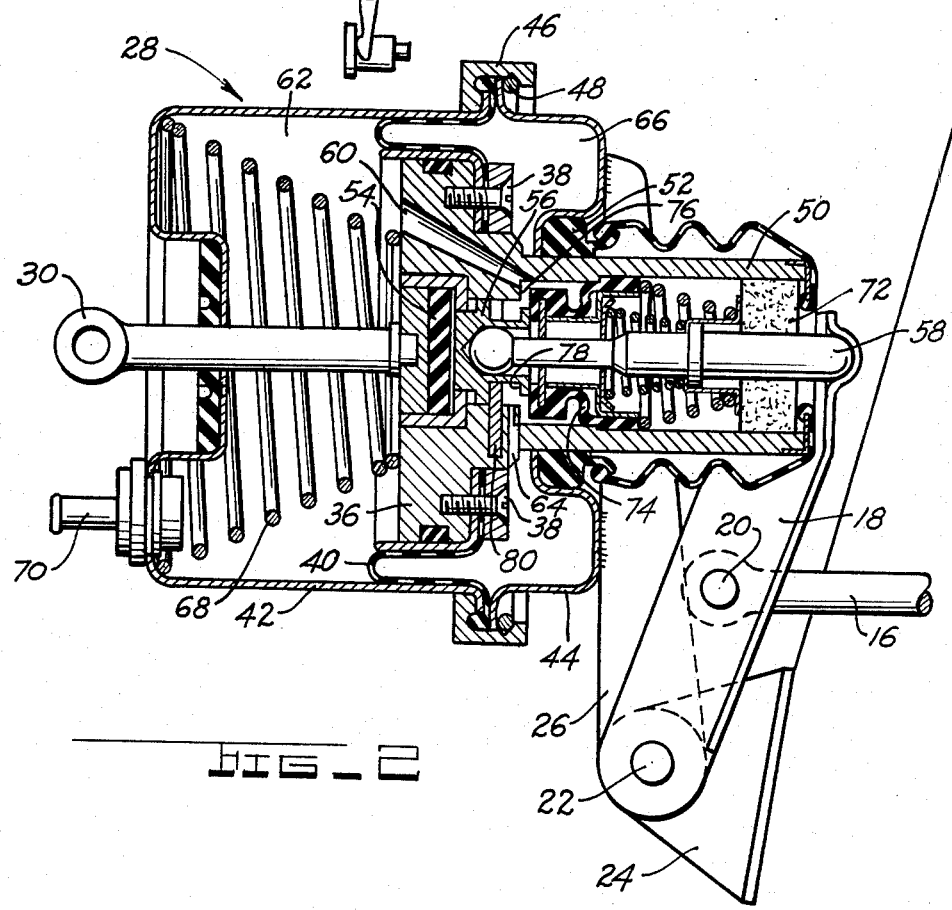
FIG_2
INVENTOR.
CHARLES R. KENRICK.
BY
Richard G. Geib
ATTORNEY.

3,177,777
POWER ASSIST MEANS
Charles R. Kenrick, South Bend, Ind., assignor to The Bendix Corporation, South Bend, Ind., a corporation of Delaware
Filed Nov. 23, 1962, Ser. No. 239,755
1 Claim. (Cl. 91—210)

It is an object of this invention to provide a power assist for manually operated devices such as clutches, brakes, throttles, etc. for automobiles, aircraft, ships and the like. More particularly, it is an object of this invention to provide a power means within a manual control system which is merely a link in the system capable of non-power force transmission.

One, but not an all-encompassing, need for my invention is with regard to automobile clutch operation. In recent years it has become increasingly important to ease the effort required for operating the various controls for an automobile. Similarly the need is ever present to increase the usable space within an automobile. Power equipment has enabled the reduction of pedal or control effort and has served to reduce the travel. Little, if any, thought has been given, however, to ways and means of incorporating power equipment as a part of the movable linkage between the operator's control and the actuated device. It is a principal object of my invention to utilize power assist equipment and/or the control therefor as part of the linkage connecting the operator's control and the actuated device.

It is also an object to utilize a power assist means to reduce travel required of the operator's control.

Still another object of my invention is to facilitate operation of a device, e.g., a clutch, regardless of the condition of my power assist means.

The above and other objects, features and advantages of the invention will be apparent in the following detailed description of an illustrative embodiment that is to be read in connection with the accompanying drawings in which:

FIGURE 1 is a schematic outline of a system employing a power assist device in accordance with my teachings; and FIGURE 2 is a detailed sectional view of my power assist means showing mounting arrangements.

With more particular regard to FIGURE 1 I show a clutch pedal lever 10 pivoted to vehicle structure, as at 12. Pivotally connected to the clutch pedal lever, as at 14, is a link 16 which link is also connected to a lever 18, as at 20. The lever 18 is pivoted by a pin 22 to support 24 attached to a vehicle frame. A motor support arm 26 is also connected to support 24 by pin 22 so that a fluid motor 28 may pivot about support 24. The motor 28 has a rod 30 extending to a bellcrank 32 which is attached to a clutch throw-out arm 34, as by a link 36.

FIGURE 2, which reverses the support of motor 28, shows one form which my fluid motor may take. In more detail, the motor support arm 26 is fastened to the motor housing. The motor includes a movable wall 36 attached, as by screws 38, to a diaphragm 40, which diaphragm is adapted to seal the jointure of housing sections 42 and 44 and held therebetween by clamp 46 and retaining ring 48. The movable wall is formed, in a preferred construction, with a tubular housing 50 which projects through an appropriate opening in housing section 44. A seal 52 serves to prevent entry or escape of fluid about the projection of housing 50 from section 44. The rod 30 is releasably affixed to the movable wall opposite the side formed with housing 50, and a rubber member 54 is interposed with rod 30 and a plunger 56 operatively connected to a valve control rod 58 to provide a deformable coupling between rods 30 and 58 which will provide feel resistance for rod 58. The ratio of input area of plunger 56 to output area for rod 30 allows rod 16 to feel a proportion of resistance to operation of rod 30.

The movable wall 36 is formed with a first passage 60 communicating a chamber 62 to the left of movable wall 36 to the cavity in housing 50, and a radial passage 64 communicates the cavity with chamber 66 to the right of movable wall 36. A spring 68 forces the movable wall to the right.

A fluid power connection is provided, as at 70, in housing section 42; while an atmosphere inlet is provided by the open end of housing 50, which atmospheric end is provided with a disc filtering member 72. A flexible valve closure member 74 is adapted to control atmospheric or fluid power communication with chamber 66 within housing 50.

In operation, an operator depresses clutch pedal lever 10 causing rod 58 to move the plunger or valve poppet 56, as it may be termed to release valve closure 74 to abut with seat 76 and disengage from poppet 56. Atmosphere then flows in the cavity of housing 50 through passage 64 to chamber 66. This causes movable wall to move to the left and rod 30 to extend to rotate bellcrank 32 and operate the clutch throw-out bearing.

In the event of power failure the motor 28 after limited movement, until the flange 78 abuts on key 80, moves as a solid link to provide manual clutch operation.

As may be appreciated by those skilled in the art, one form of my invention has been described in order to illustrate my invention. I do not propose that this is the only form my invention may take, and therefore, I maintain that the true scope and spirit of my invention is found in the appended claim.

I claim:
A control system comprising:
a control means;
a control rod connected to said control means;
a fluid pressure servomotor having a force transmitting means that is arranged to operatively connect said servomotor to said control rod, said servomotor being mounted by a support arm to a surrounding structure to allow said servomotor to reciprocate in the absence of power;
a valve means within said servomotor, which valve means is operatively connected to said force transmitting means;
a lever mounted on an axis coincident with an axis of said support arm to said surrounding structure, said lever being arranged to operate said valve means; and
a controllable device operatively connected to said lever to sequentially actuate said valve means and reciprocate said servomotor.

References Cited by the Examiner
UNITED STATES PATENTS

| | | | |
|---|---|---|---|
| 1,687,047 | 10/28 | Trail | 121—41 |
| 1,826,450 | 10/31 | Bragg et al. | 91—217 |
| 1,958,415 | 5/34 | Bragg et al. | 91—216 |
| 2,661,723 | 12/53 | Johnson | 121—41 |
| 2,705,940 | 4/55 | Edwards | 121—41 |
| 2,985,144 | 5/61 | Trippel | 121—41 |
| 3,013,536 | 12/61 | Cripe | 121—41 |
| 3,017,750 | 1/62 | Kempson | 121—41 |
| 3,035,552 | 5/62 | Hill | 121—41 |

FRED E. ENGELTHALER, *Primary Examiner.*
KARL J. ALBRECHT, *Examiner.*